United States Patent [19]

Toon et al.

[11] Patent Number: 4,989,452

[45] Date of Patent: Feb. 5, 1991

[54] LIQUID-LEVEL DETECTOR

[75] Inventors: Donald A. Toon, Burlington; Douglas J. Belshaw, Georgetown, both of Canada

[73] Assignee: Solinst Canada Ltd., Glen Williams, Canada

[21] Appl. No.: 370,821

[22] Filed: Jun. 23, 1989

[51] Int. Cl.$^5$ .................. G01F 23/02; G01N 21/41
[52] U.S. Cl. .................................... 73/293; 250/577; 340/619
[58] Field of Search .............. 73/293, 327, 291; 250/577; 340/619

[56] References Cited

U.S. PATENT DOCUMENTS

| | | | |
|---|---|---|---|
| 3,636,360 | 1/1972 | Oishi et al. | 250/577 |
| 4,193,004 | 3/1980 | Lobdell et al. | 73/293 X |
| 4,297,588 | 10/1981 | Hastbacka | 250/577 |
| 4,673,819 | 6/1987 | Rose | 250/577 X |
| 4,703,314 | 10/1987 | Spani | 250/577 X |
| 4,733,095 | 3/1988 | Kurahashi et al. | 250/577 X |

FOREIGN PATENT DOCUMENTS

| | | | |
|---|---|---|---|
| 2619445 | 2/1989 | France | 340/619 |
| 857877 | 1/1961 | United Kingdom . | |
| 1359161 | 7/1974 | United Kingdom . | |
| 1508085 | 4/1978 | United Kingdom . | |

Primary Examiner—Daniel M. Yasich
Attorney, Agent, or Firm—Anthony Asquith & Co

[57] ABSTRACT

A probe is disclosed, for lowering into a water-well or other hole. The probe includes conductivity measuring electrodes, to distinguish between e.g., water and contaminants, such as gasoline. The probe also includes an optical sensing facility to locate the junction between air and liquid. The probe comprises a transparent plastic tube, mounted inside a housing. A beam of light from a LED passes obliquely through the plastic tube and onto a photo-transistor. When liquid is encountered in the well, the liquid enters the tube: the change in refractive index now directs the beam away from the photo-transistor. The optical and conductivity sensors are both actuated at the same depth.

7 Claims, 3 Drawing Sheets

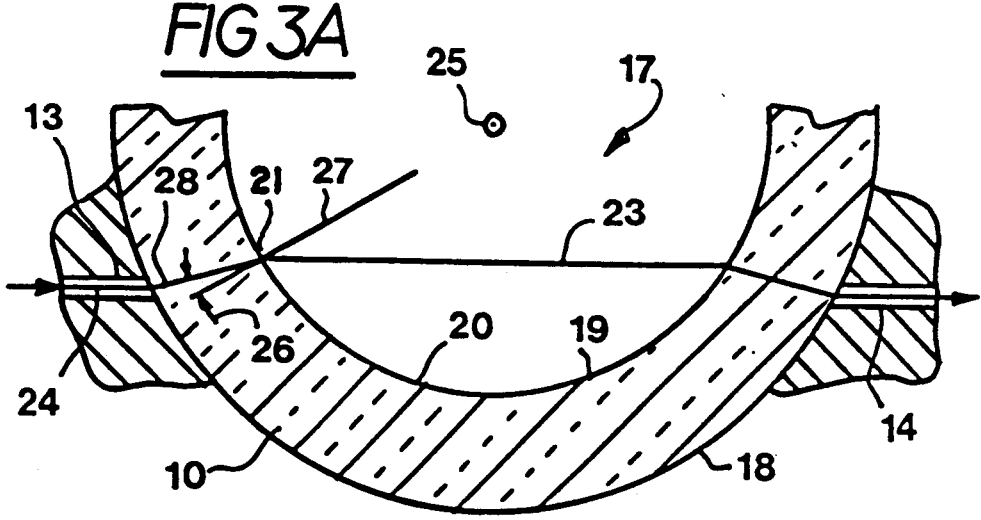
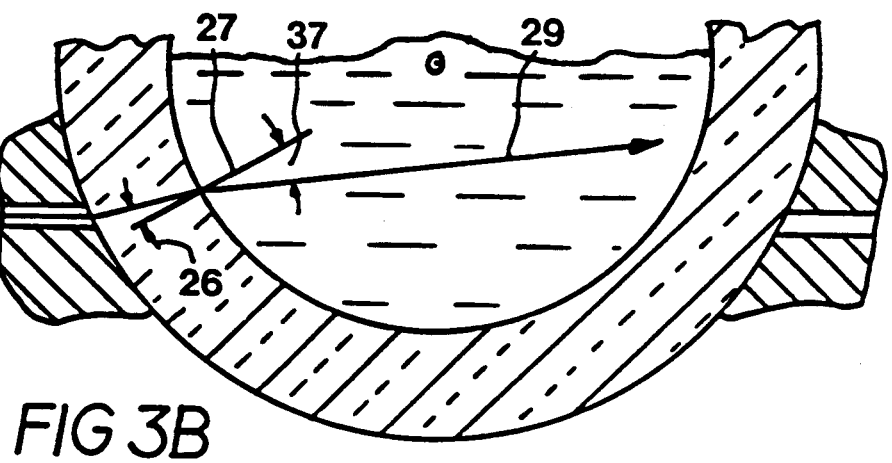

LIQUID-LEVEL DETECTOR

This invention relates to the detection of liquid levels in wells and other holes in the ground.

BACKGROUND TO THE INVENTION

There is a need to detect remotely, i.e. from the surface, the presence of liquids in ground-holes. In a water-well, one of the common requirements is to determine at what depth the water level lies in the well, and whether there is a layer of gasoline, or other hydrocarbon liquid, floating on the water. If such a floating layer is detected, there is also a requirement to determine accurately the thickness or depth of the layer. Some hydrocarbon or other contaminating liquids sometimes encountered in groundholes are heavier than water, and might form a layer beneath the water. Again, it is a requirement that such layers be detected and their thickness measured.

It is well known to determine whether a detected liquid is, on the one hand, water or, on the other hand, a hydrocarbon, such as gasoline or oil. This determination is done by measuring the electrical conductivity of the detected liquid. Hydrocarbon liquids tend to have a higher electrical resistance than groundwater, to the extent that the difference in resistivity can be harnessed for the purpose of distinguishing hydrocarbons from groundwater, with adequate reliability and consistency, using simple electrical techniques. On the other hand, the resistivity of hydrocarbon liquids is so great that it is not possible, without using sophisticated equipment, to use resistivity as the measuring means for detecting the difference between the hydrocarbon liquids and air.

It is also well known to detect the difference between air and a liquid, whether water or a hydrocarbon liquid, by using the optical properties of the liquid.

The refractive index of a liquid is substantially different from the refractive index of air. The refractive indexes of the various liquids found in the ground are not well separated, so that it is not practical to identify a particular liquid remotely by measuring its refractive index. However, it is only the presence of liquid—any liquid—that needs to be detected optically. The nature or identity of the liquid can be determined by the measure of electrical conductivity, as described.

THE PRIOR ART

A previous apparatus in which the refractive index has been used to detect a liquid may be described as follows. The apparatus comprised a probe, which included a light source, and a light sensor. The beam of light from the light source was routed through a prism. The prism was so arranged that the beam experienced total internal reflection in the prism when the prism was surrounded by air. When the prism encountered liquid, the total internal reflection was lost, which meant that, in liquid, the light beam did not enter the light sensor. The sensor provided a signal that could be received at the surface.

One disadvantage was that this previous apparatus not only required careful setting up, but was fragile, in the sense that a physical knock could affect the adjustment of the prism. Also, it was difficult to arrange that the light path was long enough that the change in the angle of the beam, due to the change in refractive index, would move the beam a sufficient distance to cancel the total internal reflection.

Thus the problems were those of unreliability: that sometimes the presence of a liquid would not cut off the light to the sensor, and sometimes the light to the sensor could be cut off if the sensor were jarred.

The invention provides a manner of utilising the difference in refractive index, in which the probe is less prone to false readings, more accurate, more sensitive, and at the same time physically more robust.

An example of a liquid detector for lowering down a hole, which also utilizes the refraction of light, is shown in GB No. 1508085 (HECTRONIC 1978). Other examples of apparatus which utilize refraction of light for detecting liquid levels are shown in U.S. Pat. No. 4,297,588 (HASTBACKA 1981), in GB No. 1359161 (JOBLING 1974), and in U.S. Pat. No. 4,193,004 (LOBDELL 1980).

GENERAL DESCRIPTION OF THE INVENTION

In the invention, the difference in refractive index between air and a liquid is used to detect the difference between air and a liquid in the hole, as in the previous apparatus.

In the invention, the light beam from a light source passes through a transparent medium, which may be for example a piece of transparent plastic tubing. A surface of the transparent medium is exposed to the contents of the hole, is either to air or to whatever liquid is present in the hole. This surface comprises an optical interface through which the light beam passes.

In the invention, the interface lies at an angle to the beam of light. It is arranged that, when the interface is exposed to air, the light beam is refracted at the interface, and, upon being refracted, is directed towards a light sensor, which is positioned in the path of the light beam. When the interface is exposed to the liquid, the light beam again is refracted at the interface, but now it is arranged that the changed angle at which the light beam emerges from the interface is such that the light beam no longer strikes the sensor.

For good sensitivity, the light sensor should be well-spaced from the interface. The difference between the angle at which the air-refracted beam leaves the interface and the angle at which the liquid-refracted beam leaves the interface may be termed the difference-angle. The difference-angle depends on the optical properties of air, liquids, and the transparent medium. The light sensor has to be well-spaced from the interface in order that the difference-angle can move the path of the light beam far enough that the light beam no longer falls on the light sensor.

It is recognised in the invention that adequate spacing between the interface and the light sensor can be achieved when the interface and the light sensor are on opposite sides of a tube; being a tube with the kind of diametral dimensions that are appropriate for a probe to be lowered into a hole.

A typical value for the difference-angle is 15 degrees. The spacing that can be provided between the interface and the light sensor in a typical probe is at least 5 mm. It is recognised that a small photo-transistor can easily be provided as the light sensor, which will respond accurately and reliably to such movement.

The probe can be very reliable, in the invention, because the light sensor is small enough to be embedded in the wall of the probe: not only is the probe itself robust, but the setting of the light sensor is undisturbed even by quite vigorous knocks.

The invention allows the optical sensor and the conductivity sensor included in the apparatus to be compatible as regards service reliability, and operational accuracy. In the invention, the two sensors may be quite independent of each other physically, yet their operations may be combined to give the required accuracy and freedom from false readings.

The invention will now be further illustrated by the description of examples of probes or detectors, which embody the invention.

DETAILED DESCRIPTION OF PREFERRED EMBODIMENT

Figure 1:
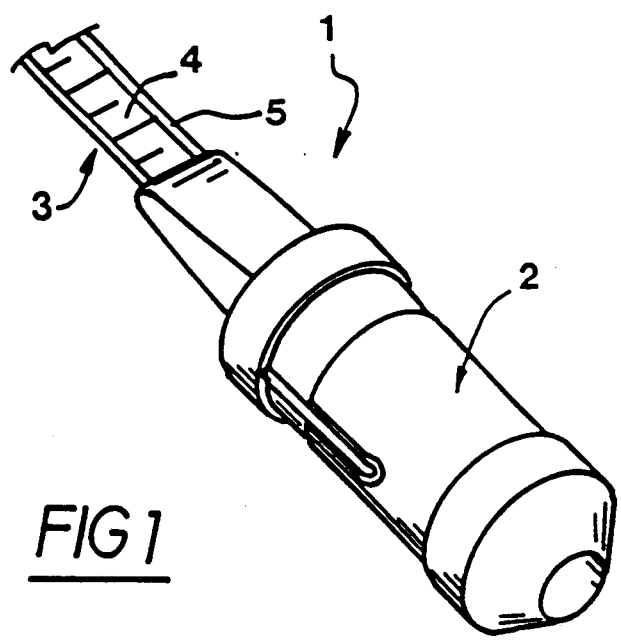
Figure 2:
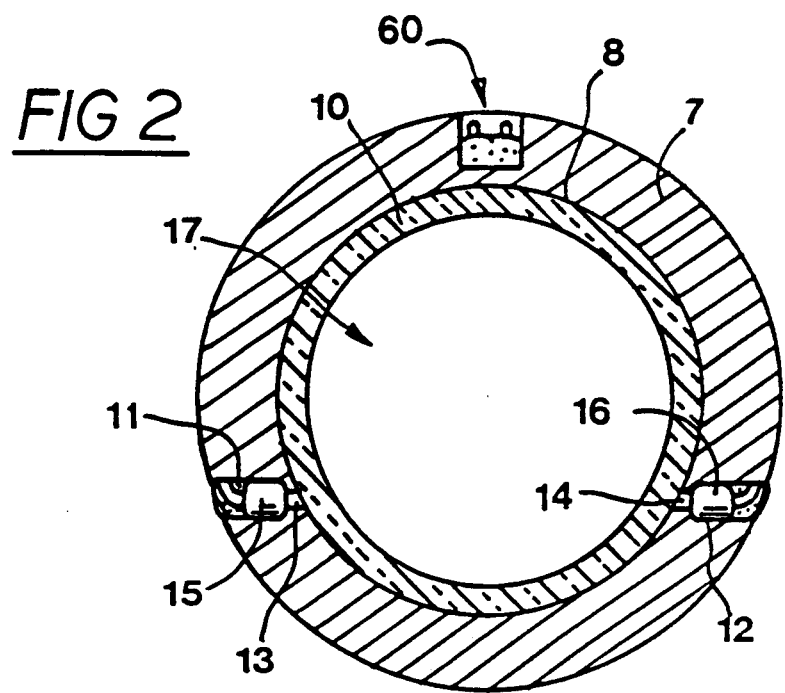
Figure 4:
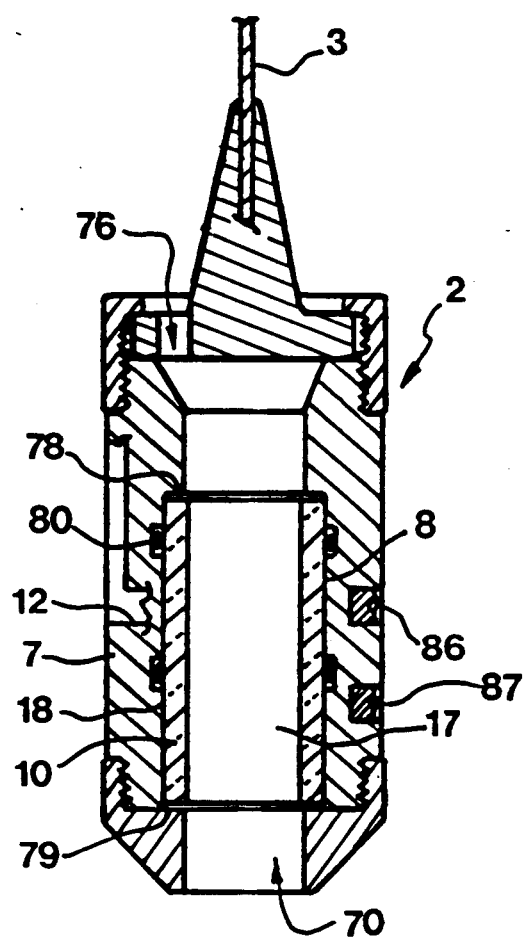
Figure 5:
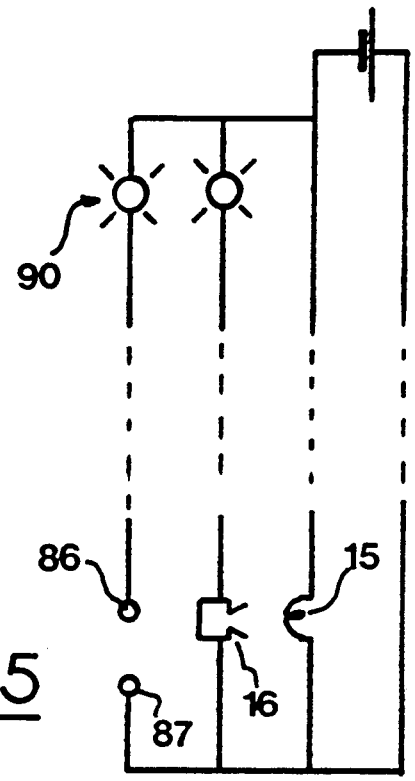

In the accompanying drawings:
FIG. 1 is a pictorial view of an exemplary probe;
FIG. 2 is a cross-sectional view of the probe of FIG. 1, on the line 2—2;
FIGS. 3A and 3B are light path diagrams relating to the probe of FIG. 1;
FIG. 4 is a cross-sectioned elevation of the probe of FIG. 1;
FIG. 5 is a diagrammatic representation of an electrical circuit used with the probe.

The probe 1 of FIG. 1 includes a housing 2 and a suspension tape 3.

The suspension tape 3 is of a proprietary kind, and includes a graduated scale 4. Running along the two edges of the scale 4 are respective pairs of electrically-conductive wires 5.

The remote end of the suspension tape 3 is wound onto a drum, which remains at the surface while the probe 1 is lowered into a test-hole in the ground. A suitable arrangement is made for monitoring the electrical status of the conductors.

The housing 2 of the probe 1 has a thick wall 7, the inner surface 8 of which defines a hollow interior. A length 10 of glass tubing is inserted into the housing, and is a tight fit in the inner bore 8 of the housing. The tube 10 may be cemented in place.

Formed in the thick wall 7 of the housing 2 are two pockets 11,12. Each pocket communicates with a respective narrower hole 13,14. The two narrower holes 13,14 are co-axial, and are formed as a single drilled hole passing right through the housing. It may be noted that the axis of the through-hole 13,14 is chordal, and not diametral, with respect to the tube 10.

The pocket 11 houses a light emitting station which includes a light-emitting diode 15. The electrical leads to the LED 15 pass through suitable grooves and passages formed in the housing, as may be seen in FIG. 1. The LED and its leads are cemented into the housing using a suitable potting compound.

The other pocket 12 houses a light-receiving station, which includes a photo-transistor 16, which is potted, along with its electrical leads, in a similar manner, into the housing 2.

The inside of the tube 10 forms a chamber 17. The chamber 17 is open top and bottom. If the probe, in descending, encounters a liquid level, the liquid enters the chamber 17 through the port 70, and leaves through the exit port 76.

The light beam that is emitted from the LED 15 is collimated to some extent by the lens which is commonly built into most designs of LED. The beam is further collimated by its passing through the narrow hole 13.

The collimated beam encounters the outer cylindrical surface 18 of the transparent tube 10, passes through the wall of the tube, and emerges at a point of refraction 21 from the inner surface 19 of the tube 10 into the chamber 17. The beam then passes again through the inner surface, the wall, and the outer surface, and enters the narrow hole 14 before finally passing to the photo-transistor 16. The beam is refracted as it traverses this path as shown in FIG. 3A.

The inner surface 19 of the tube 10 defines an interface 20 between the transparent material of the tube 10 and the contents of the chamber 17. If the chamber contains air, then the light beam passes through from the light-emitting station to the light receiving station along the path illustrated in FIG. 3A.

It will be noted that the angle of incidence 26 is considerable. (The angle of incidence 26 is the angle that the light path, as it approaches the interface 20, makes to the normal 27 of the interface 20.) This means that the effect of refraction in changing the direction of the light beam is quite marked.

The angle at which the interface lies in relation to the light beam is set and maintained automatically, in the exemplary probe. There is no requirement for careful adjustment and setting up of the important optical angles in the probe, and the angles are most unlikely to change, even if the probe should be knocked or otherwise abused.

For good sensitivity, the axis 24 of the throught-hole 13,14 lies at a considerable distance from the axis 25 of the tube 10. The chordal path 23 taken by the light beam (in air) through the chamber consequently also is a considerable distance from the axis 25. The normal 27 of the interface 20 therefore automatically lies at a considerable angle of incidence 26 to the path 28 of the light beam as the beam approaches the interface 20.

If and when the chamber 17 contains a liquid, the index of refraction at the interface 20 changes, and the light beam therefore emerges into the chamber 17 along a different path 29, i.e. at a different angle of refraction 37. The dimensions of the components are so arranged that the differently-refracted beam 29 (i.e. the liquid-refracted beam) does not enter the narrow hole 14; the condition shown in FIG. 3B.

When there is a liquid present in the chamber 17, therefore, the light beam does not reach the photo-transistor 16. The transistor 16 sends an appropriate signal to that effect, which is detected at the surface.

The term "light" in this specification includes infra-red radiation as well as visible light. Infra-red emitters and detectors in fact generally are less expensive for a given degree of operational reliability than the corresponding visible-light components.

Infra-red emitters are preferred also because they operate with a negligible temperature rise.

It has been found that any clear liquid (of the kind likely to be encountered in a groundhole) refracts the beam away from the phototransistor 16. Yet the apparatus is not over-sensitive nor prone to error. Also, it requires comparatively little skill and precision to so mount the components in the housing that the beam always enters the phototransistor whenever the chamber is empty of liquid. The manner of mounting is such that the settings and angles are not lost even if the probe should suffer abuse or knocks. The comparatively fragile electrical components are buried safely in the thickness of the housing wall.

In the invention, it is important that the light path be at the correct distance from the axis 25 of the chamber. If the centre-line 24 is too far away from the axis 25, the refraction angles will be too great and the beam will undergo total internal reflection, and never reach the phototransistor. On the other hand, the centre-line 24 should not be too close to the axis 25, or the refraction will be so slight that the beam even when refracted will still strike the phototransistor.

The actual limits depend on the refractive indexes of the liquids encountered, and on the refractive index and the diameter of the tube 10. It is recognised in the invention that the chord-to-axis distance becomes more critical the smaller the diameter of the tube 10. It is recognised that, for a glass tube of 16 mm external diameter, and a nominal chord-to-axis distance of 6.92 mm, the manufacturing tolerance on the chord-to-axis distance is acceptable, but the tolerance problems would become quite serious if the tube were any smaller than that. In fact, it is recognised that if the tube were too small, it would become not practically possible to utilise the refraction of the light beam to activate a phototransistor, as is required in the invention.

In the invention, it is recognised that the required dimensions of the tube, as dictated by its use as a probe for down-hole applications, are towards the limit of the range of dimensions for which adequate refractive action, and acceptable manufacturing tolerances apply to the chord-to-axis distance, but that, nevertheless, the tube is just within the acceptable range.

It is also important that the power rating of the LED 15 be within acceptable limits. Naturally, the LED must have sufficient power to reach the transistor, but the LED also must not be too powerful: if the LED's output were too high, scattered light might still reach, and activate, the phototransistor, even when the beam was refracted.

The conductivity sensor 60 that is included in the probe may be of conventional construction, comprising two pins, spaced a small distance apart. The conductivity sensor is embedded in the thickness of the housing wall, and the leads are passed through suitable grooves and passages in the housing.

As an alternative to the form of the conductivity sensor 60 shown in FIG. 2, the two electrodes in the sensor may be spaced well apart, either around the circumference of the housing, or at different axial locations on the housing.

If it is desired that the electrodes of the conductivity sensor be large, for the purpose of ensuring a reliable contact with the liquid, the electrodes may take the form of spaced-apart rings which encircle the housing.

For good accuracy of depth measurement, it is advantageous to arrange that the electrodes, even if they are to be of a large area, do not have a large axial dimension. Thus, for accuracy, preferably the electrodes comprise respective lengths of wire 86,87 disposed circumferentially, one above the other, as shown in FIG. 4.

When the spacing of the electrodes is axial, only the upper electrode 86 is required, for accuracy, to be of the small axial dimension. The other electrode may alternatively be constituted by the housing 7 itself, if the housing 7 is made of metal—preferably though, the housing is made of (inert) plastic material, such as PTFE.

As the probe is lowered into the liquid, a depth L1 is reached at which the liquid refracts the beam of light away from the sensor 14, and the resulting signal from the optical portion of the sensor indicates that a liquid has been encountered. Also, a depth L2 is reached at which the liquid bridges the space between the electrodes: if the liquid is gasoline etc, the resistance across the space is measurably greater than if the liquid had been water.

The presence of a large or of a small resistance between the electrodes of the conductivity sensor is detected at the surface. The presence of either air or liquid also may be detected at the surface, through the operation of the optical sensor.

FIG. 5 shows the electrical circuit diagram for use with the described probe. (The diagram is intended merely to indicate the functions required: the actual operations generally will require more sophisticated components, as will be apparent to the skilled expert.)

Two signal lamps 90 may be provided at the surface, one for the conductivity sensor and one for the optical sensor, and the combination of the lamps can be used to indicate the depth at which the probe encounters gasoline, and the depth, below that, at which the probe encounters water. If no layer of gasoline is present, that fact is clearly discernible by the manner in which the lamps 90 operate.

Other forms of indicator, such as alert alarms, may be used instead of the signal lamps.

It is preferred that the optical sensor and the conductivity sensor be positioned so that both are actuated at exactly the same depth, and for convenience it is preferred that this depth be the zero point of the scale 4.

If the two sensors were not at the same level, e.g. if the actuation depth L1 of the optical sensor were higher than the actuation depth L2 of the conductivity sensor, it would not be possible to detect a floating layer of gasoline if the layer were thinner than the distance between L1 and L2; conversely, if L1 were lower than L2, a gasoline layer having a thickness or depth equal to the distance between L1 and L2 would be indicated even if no gasoline were present at all. In both cases, the distance read off the scale 4 as being the thickness or depth of the gasoline layer would be in error by the difference between L1 and L2.

As shown in FIG. 4, the glass tube 10 is mechanically located within the housing 7 between the upper and lower opposed shoulders 78,79, and within the bore 8. The dimensions are such that the tube is slightly shorter than the distance between the shoulders.

Two seals 80 are contained within grooves formed in the bore 8 of the housing. The light emitting and receiving stations are positioned in the portion of the bore that lies between the seals, whereby the points at which the light path intersects with the outer cylindrical surface 18 are isolated: the liquid into which the probe is being dipped is denied access to the points of intersection.

It may be noted that the constructional arrangement of the apparatus as described permits the optical and conductivity sensors to operate independently; permits the electrodes to be isolated electrically from the liquid and from each other; permits the optical stations to be mounted robustly and securely against being disturbed due to abuse; and at the same time permits the conductivity sensor and the optical sensor to be at the same level.

We claim:

1. Apparatus, which is suitable for lowering into a body of a test liquid and for detecting and signalling the presence of the test liquid, wherein:
   the apparatus includes a light emitting station, which is capable of emitting a beam of light, a light receiving station, a housing, and a tube;

the tube is made of a solid transparent material, and is cylindrical, having an outer cylindrical surface and an inner cylindrical surface;

the inner cylindrical surface defines a hollow internal chamber of the apparatus;

the light emitting station, the light receiving station, and the tube, are mounted in a housing, in such a manner that the stations and the tube are mechanically secured against movement relative to the housing and against movement relative to each other;

the stations lie outside the tube and lie on a chord of the tube, said chord being not a diameter of the tube;

the arrangement of the stations in the housing is such that, when the chamber is empty of the test liquid, light from the light emitting station passes in sequence along a light path which intersects the outer cylindrical surface, passes through the transparent material, intersects the inner cylindrical surface at a point of refraction, passes across the hollow chamber, intersects the inner cylindrical surface, passes back through the transparent material, intersects the outer cylindrical surface, and passes into the light receiving station;

the arrangement of the stations in the housing is such that, when the apparatus has been lowered to a sufficient depth into the body of test liquid that the liquid is present in the chamber and is in contact with the inner cylindrical surface at the point of refraction, the said beam is diverted by refraction at the point of refraction, and does not pass into the light receiving station;

the apparatus includes a means for detecting and signalling whether or not the beam of light is passing into the light receiving station;

the chamber includes a port for admitting the test liquid into the chamber when the apparatus is lowered into the liquid;

the apparatus includes a sealing means, which is so arranged that, when the apparatus is lowered into the test liquid, the sealing means is effective to prevent access by the liquid to both points on the outer cylindrical surface at which the said light path intersects the outer cylindrical surface.

2. Apparatus of claim 1, wherein:

the apparatus is so arranged that the said sufficient depth to which the apparatus is lowered into the test liquid is a depth L1;

the apparatus includes a pair of electrodes, mounted in a spaced apart relationship upon the housing;

the apparatus includes a resistance measuring means, which is effective to measure the electrical resistance between the electrodes;

the electrodes are so positioned as to make electrical contact with the test liquid as the apparatus is lowered into the test liquid;

the electrodes are so positioned that the space between the electrodes is bridged by the test liquid only upon the apparatus being lowered more than a depth L2 into the liquid.

3. Apparatus of claim 2, wherein the levels L1 and L2 are, in substance, the same.

4. Apparatus of claim 3, wherein:

the chamber includes an exit port, which is so positioned as to permit liquid that has entered the chamber to exit from the chamber, the arrangement of the ports being such that liquid passes through the chamber in the upwards directional sense relative to the chamber as the apparatus is lowered down through the liquid;

the housing is formed with positionally-opposed upper and lower internal shoulders;

the housing is formed, between the shoulders, with a cylindrical bore;

the tube is physically positioned in the bore, between the shoulders;

the bore includes upper and lower seal grooves, provided with respective seals, the arrangement being such that the seals surround the tube, and sealingly isolate the portion of the tube that lies between the upper and lower seals;

the two stations are set into respective station-receiving holes formed in the material of the housing, the holes being formed through the cylindrical bore of the housing, and being open to the tube;

the station-receiving holes lie in the portion of the housing that lies between the two seals;

and wherein the material of the tube is glass.

5. Apparatus of claim 1, wherein the chamber includes an exit port, which is so positioned as to permit liquid that has entered the chamber to exit from the chamber, the arrangement of the ports being such that liquid passes through the chamber in the upwards directional sense relative to the chamber as the apparatus is lowered down through the liquid.

6. Apparatus of claim 1, wherein:

the housing is formed with positionally-opposed upper and lower internal shoulders;

the housing is formed, between the shoulders, with a cylindrical bore;

the tube is physically positioned in the bore, between the shoulders;

the bore includes upper and lower seal grooves, provided with respective seals, the arrangement being such that the seals surround the tube, and sealingly isolate the portion of the tube that lies between the upper and lower seals;

the two stations are set into respective station-receiving holes formed in the material of the housing, the holes being formed through the cylindrical bore of the housing, and being open to the tube;

the station-receiving holes lie in the portion of the housing that lies between the two seals.

7. Apparatus of claim 1, wherein the material of the tube is glass.

* * * * *